March 28, 1939. H. W. BARNHART 2,152,018
PLANT SUPPORT OR TRAINER
Filed March 17, 1937

Inventor
HOMER W. BARNHART.
By Robert Robb
Attorneys

Patented Mar. 28, 1939

2,152,018

UNITED STATES PATENT OFFICE 2,152,018

PLANT SUPPORT OR TRAINER

Homer W. Barnhart, Perth Amboy, N. J.

Application March 17, 1937, Serial No. 131,474

6 Claims. (Cl. 47—44)

In the growing of plants, it is often desirable to provide means for supporting and training plants, especially young plants which are not hardy enough to grow in the proper manner without some means of support.

In providing supporting and training means of the type set forth, it is highly desirable that the supporting or training means shall be quickly erectable and adaptable to varied conditions of use. One of the objects of this invention, therefore, has been to provide means, as above set forth, which may be of standarized form, although adapted for varied conditions of use, and which may be easily and inexpensively manufactured.

In addition, it has been an object of this invention to provide a plant supporting member which is quickly attachable to and detachable from upright or standard member or members and quickly and easily adjustable for adaptation to various conditions.

In one form, my invention comprises an upright or standard member, to which is attached a circular supporting member in the form of a strap of suitable metal, having one or more holes therein for cooperation with a projection or projections at one end thereof, for the purpose of adjusting the supporting member in reference to length and locking said member to the standard member in supporting position.

In another form, my invention comprises a plurality of upright or standard members which may be located at spaced intervals, and a supporting member made from suitable material and attached to the upright members in such a manner that the enclosure may consist of any suitable dimensions or shapes, the supporting member being essentially the same as that of the form first described.

In the drawing—

Figure 1:
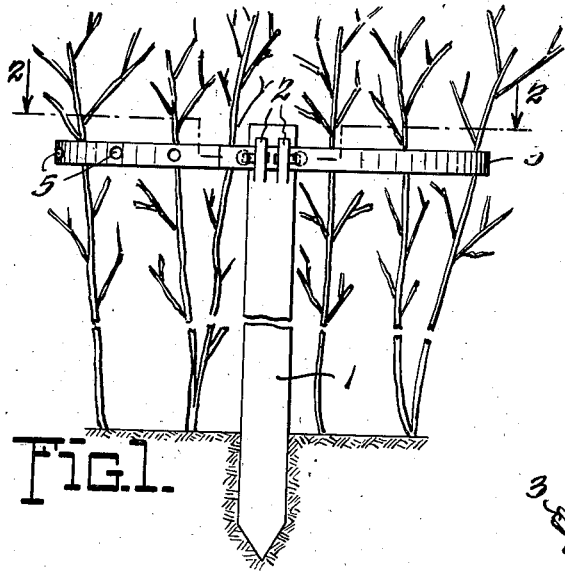
Figure 1 shows generally one adaptation of the invention, as when positioned for supporting plants.

The upright or standard member 1 is illustrated as being in the form of a metal stake adapted to be driven into the ground and having pressed outwardly therefrom fingers 2 which engage with and support the supporting member, generally indicated at 3, when the latter is in supporting position. The fingers being resilient engage the supporting member with a spring-like clamping action.

The supporting member 3, as illustrated in Figures 1 to 4, comprises a resilient metal strap or band which is indicated to be of circular form and which has pressed inwardly toward its center, at one end thereof, projections or prongs 4 and 4a adapted to cooperate with holes 5 formed at spaced intervals in the metal strap or band 3.

In use, the upright or standard member 1 is driven into the ground and the supporting member 3 is arranged in circular form around the plants to be supported or trained, as indicated in Figure 1.

Figure 3:
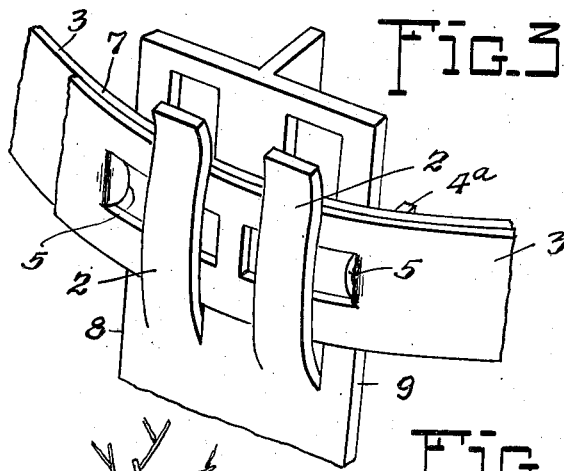
Figure 3 is a detail perspective view showing the means for adjustment of the supporting member and for attaching it to the standard member.

As seen best in Figure 3, one end of the metal band or strap 3, at which end are located the inwardly projecting prongs 4 and 4a, overlies the other end 7 of said metal band or strap 3. The metal strap 3 is now adjusted to the desired circumference and the projections 4 and 4a pushed through the nearest holes 5 in such a manner that the prong 4 will abut against an edge 8 of the standard member 1 and a prong 4a will abut against the opposite edge 9 of said standard member 1. The abutment of the prongs 4 and 4a against the edges 8 and 9 of the standard 1 locks the metal band 3 against the tendency to expand circumferentially, while the fingers 2 of the standard member 1 engage the metal band 3 so that it is held, in a fairly rigid manner, in a horizontal position.

Figure 2:
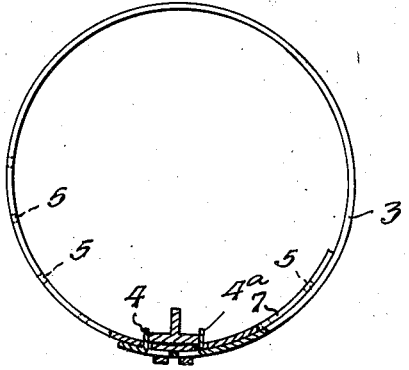
Figure 2 is a top view of the device, looking in the direction of the arrows 2—2 of Figure 1, and showing the method of attaching the supporting means to the standard in supporting position, adjusting the supporting means, and showing the supporting means locked in one of its circumferentially adjustable positions.
Figure 4:
Figure 4 is a top plan view showing the supporting member locked in one of its adjustable positions.
Figures 5, 6:
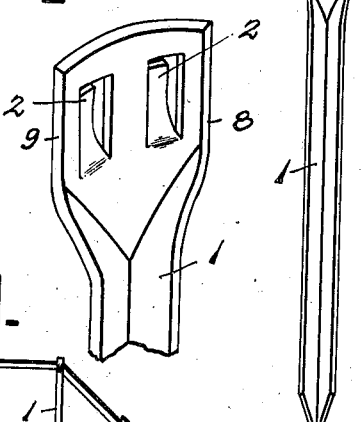
Figures 5 and 6 show a modified form of the upright or standard member, as of V-formation.

In Figures 5 and 6 is shown a modification of the upright or standard member 1, in which the said member 1 is formed partially in a V-shape, providing a very rigid member which may be more cheaply manufactured than the T-shaped standard member shown in Figures 1 to 3. The essential features of the standard member shown in Figures 5 and 6, however, are the same.

Figures 7, 8:
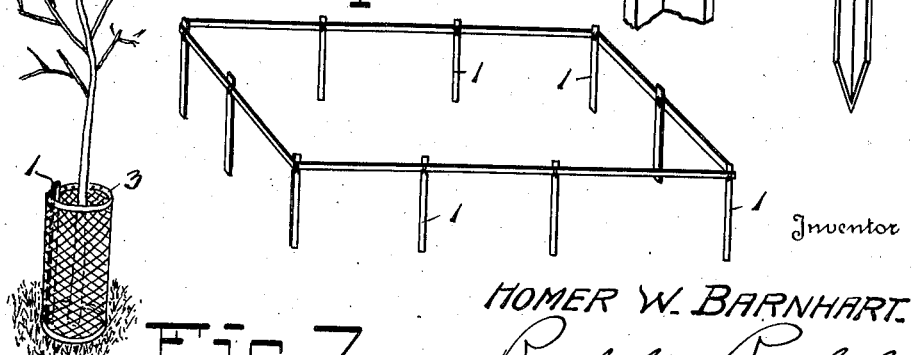
Figure 7 shows an adaptation of the invention as when used with fence wire to form a protective enclosure for a tree.
Figure 8 illustrates another use of the invention, as when employing a plurality of standard members to form a fence or enclosure.

In Figure 7 there is illustrated a method of utilizing the standard member described having two sets of finger members 2, one at the upper portion thereof and one at the lower portion. Two metal straps or supporting members are utilized, one to be attached in cooperation with the upper pair of finger members and one to be attached in cooperation with the lower pair of finger members, to which supporting members fence wire is attached so that it forms a fenced or protective enclosure. The method of adjusting the supporting members circumferentially is the same as above described.

In Figure 8 is illustrated another method of use of the invention for the purpose of the fence or enclosure. A plurality of standard members 1 are placed at spaced intervals, driven into the ground, or set in some manner, such as in cement, in order to be in upright positions, and a length of metal strap, provided at spaced intervals with holes, as above described, and at one end with the prong members mentioned, is placed so that it is supported at various points by the fingers 2 of the various standard members 1, and at a certain convenient point the prongs 4 and 4a cooperate with the holes 5 and edges 8 and 9 of one of the standard members, for locking the metal strap in the desired position.

Having thus described my invention, what I claim as new and desire to secure by Letters Patent of the United States, is—

1. A plant support or trainer comprising, in combination, a standard member formed with outwardly pressed fingers, and a supporting member adapted to be supported by said fingers in supporting position, comprising a metal band or strap, one end of which is adapted to overlie the other when in supporting position, said metal band being provided with holes at spaced intervals throughout its length and at one end being formed with projections or prongs, said prongs cooperating with said holes for adjusting the length of the strap.

2. A plant support or trainer comprising, in combination, a standard member formed with outwardly pressed fingers, and a supporting member adapted to be supported by said outwardly pressed fingers in supporting position, comprising a metal band or strap, one end of which is adapted to overlie the other when in supporting position, said metal band being provided with holes at spaced intervals throughout its length and at one end being formed with inwardly pressed projections or prongs, said prongs co-operating with said holes for adjusting the length of the strap, said prongs adapted to abut against opposite edges of said standard member for locking the supporting member in adjusted position.

3. A plant support or trainer comprising, in combination, a supporting standard having members thereon to carry a plant supporting member, a plant supporting member comprising a body to extend around and support a plant or plants, said plant supporting member being disposed at an angle to the supporting standard and having parts interlocking with the supporting standard to prevent horizontal shifting of the plant supporting member relative to the standard.

4. A plant support and trainer device comprising, in combination, a vertical standard formed with outwardly pressed fingers, a horizontal plant supporting member adapted to be supported by said fingers, the horizontal supporting member comprising adjustable portions having means to interlock with one another and to interlock with the standard, and said fingers constituting means for maintaining the adjustable portions of the supporting member interlocked with one another and for yieldably gripping the supporting member.

5. A plant support and trainer device, comprising, in combination, a vertical standard having spring clamping fingers pressed out therefrom and opening upwardly in relation to the standard, and a plant supporting member horizontally disposed on the standard and clamped between the body of the standard and said spring fingers pressed therefrom and having relative movable portions, said horizontal supporting member being formed with prongs projected therefrom to interlock said relatively movable portions of the supporting member with each other, said prongs engaging the standard for holding the supporting member against horizontal movement when adjusted upon a standard in cooperation with the spring fingers.

6. A plant support and trainer device, comprising, in combination, a vertical standard having parts at its upper portion to support a plant support member, a plant supporting member comprising a band-like body having its ends overlapping so as to contract or expand, prongs on one end of the plant supporting member to interlock with the other end to fix the size of the supporting member, the said prongs being so disposed as to engage the standard to prevent horizontal displacement of the supporting member relative thereto.

HOMER W. BARNHART.